United States Patent
Bürmann

(10) Patent No.: US 6,318,057 B1
(45) Date of Patent: Nov. 20, 2001

(54) APPARATUS FOR MOUNTING A CROP-CUTTING DEVICE ON A PIVOTAL FEED RAKE

(75) Inventor: Dominik Bürmann, Verl (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 09/669,139

(22) Filed: Sep. 26, 2000

(30) Foreign Application Priority Data

Oct. 13, 1999 (DE) .............................. 199 49 213

(51) Int. Cl.$^7$ .................................................. A01D 41/14
(52) U.S. Cl. .......................................... 56/10.2 R; 56/208
(58) Field of Search ................... 56/10.2 R, 2.8, 56/14.5, 14.6, DIG. 9, DIG. 15; 460/16, 70, 2, 1, 3, 116

(56) References Cited

U.S. PATENT DOCUMENTS

| 3,474,606 | 10/1969 | Oehler et al. |  |
|---|---|---|---|
| 3,591,950 | * 7/1971 | Weichel | 56/364 |
| 4,327,543 | * 5/1982 | Currie et al. | 56/344 |
| 4,332,127 | * 6/1982 | Staiert et al. | 56/10.2 R |
| 4,707,972 | 11/1987 | Knepper. |  |

FOREIGN PATENT DOCUMENTS

| 44 29 384 | 2/1996 | (DE) | A01D/41/14 |
|---|---|---|---|
| 1 208 285 | 10/1970 | (GB) | A01D/41/00 |

* cited by examiner

*Primary Examiner*—Robert E. Pezzuto
(74) *Attorney, Agent, or Firm*—Husch & Eppenberger, LLC; Robert E. Muir; H. Frederick Rusche

(57) ABSTRACT

An apparatus for mounting and retaining a crop-cutting device on a pivotal feed rake of a harvesting machine includes at least two pairs of spaced web plates attached to the crop-cutting device, a plurality of load-bearing rods mounted between each pair of spaced web plates, a horizontal axle that connects the crop-cutting device and the pivotal feed rake, and at least two hydraulic cylinder units with the piston end of each unit having a pick-up hook designed to engage one of the plurality of load-bearing rods. This arrangement allows the angular position of the crop-cutting device to be adjusted in a simple manner relative to the feeder housing by pre-selecting those load-bearing rods which are to be engaged by the pick-up hooks when mounting the crop-cutting device on the feeder housing.

9 Claims, 3 Drawing Sheets

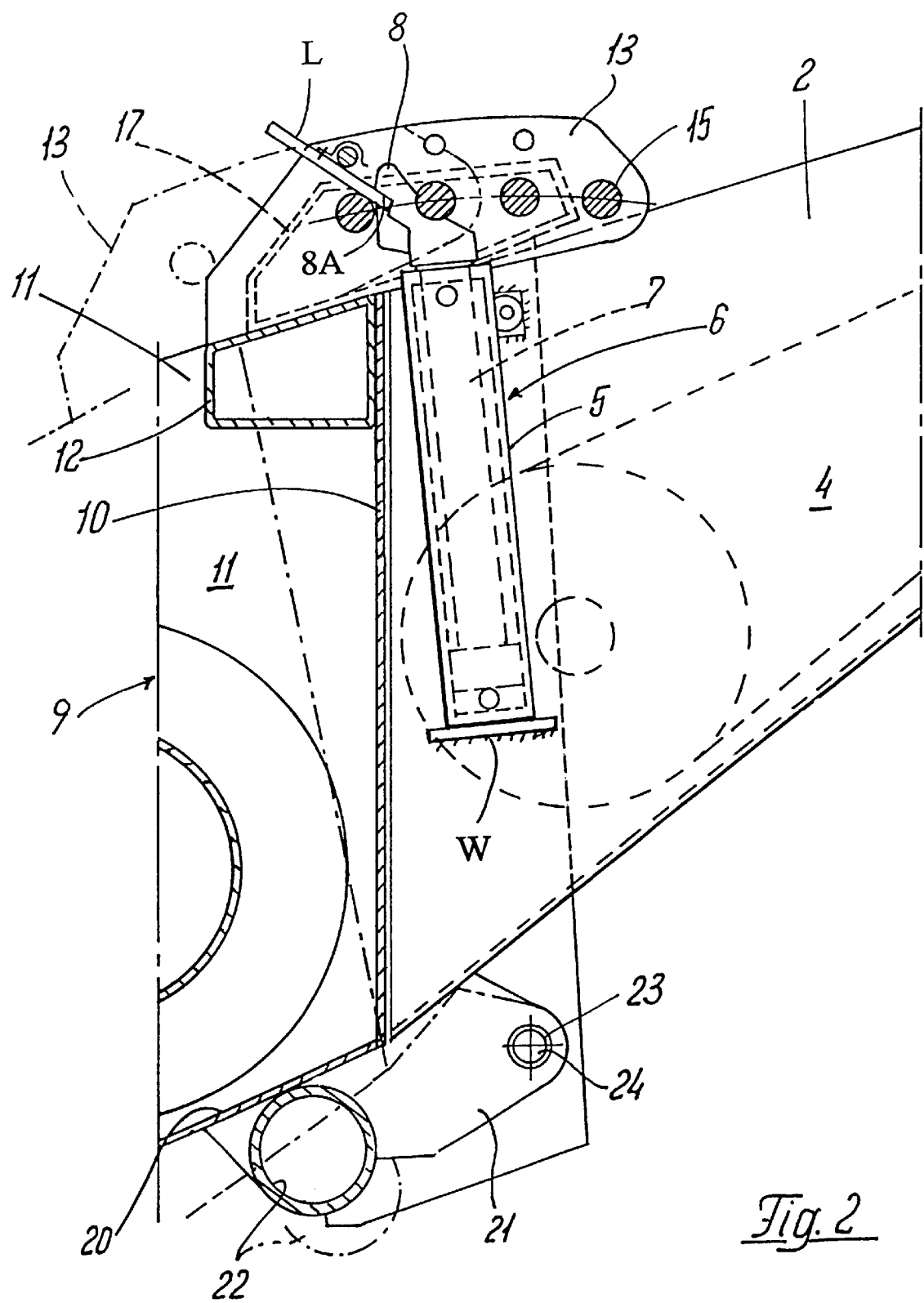

US 6,318,057 B1

APPARATUS FOR MOUNTING A CROP-CUTTING DEVICE ON A PIVOTAL FEED RAKE

FIELD OF THE INVENTION

The present invention relates generally to agricultural machinery and, more particularly, to an apparatus for mounting a crop-cutting device on a feed rake of a harvesting machine, such as a combine harvester.

BACKGROUND OF THE INVENTION

The front end of a combine harvester normally includes a feed rake, or feeder housing, and a crop-cutting device. The feed rake is pivotally mounted to the harvester housing, and the crop-cutting device is mounted to the feed rake. It is advantageous for the crop-cutting device to be pivotally mounted to and removable from the feed rake.

Typically, the crop-cutting device is mounted to the feed rake by its rear portion, sometimes referred to as a cutterbar trough. U.S. Pat. No. 3,474,606 describes a combine harvester in which the cutterbar trough is pivotally mounted to the feed rake about a horizontal transverse axle located close to the ground. This arrangement allows the angular position of the crop-cutting device to be adjusted relative to the ground. Such adjustment is often made based on the type of crop being harvested. Mechanically or hydraulically controlled adjusting apparatus are linked at one end to the rear wall of the cutterbar trough and to the feeder housing at the other to adjust the angular position of the crop-cutting device. The adjusting apparatus have no load bearing function. The adjusting apparatus pivot the entire crop-cutting device about the horizontal bearing axle. One drawback of the above-described arrangement becomes apparent when the crop-cutting device must be removed from the feed rake. To accomplish this task, the adjusting apparatus and the horizontal bearing axle must first be removed. It is very difficult to do this in the field because the position of the crop-cutting device, when lowered to the ground, will never be exactly parallel to the front axle of the combine harvester due to the ever present unevenness of the ground. Therefore, the horizontal bearing axle, by which the cutterbar trough is connected to the feeder housing, will be at an angle. For this reason a device of this type has not gained general acceptance.

A another arrangement for mounting a crop-cutting device is described in German patent 44 29 384. There hydraulic operating cylinders are provided on the front face of the feed rake. Pick-up hooks are attached to the free ends of the cylinder pistons. Pairs of web plates are rigidly connected to the upper edge of the rear wall of the cutterbar trough of the crop-cutting device. A load-bearing rod is mounted between each pair of web plates. To mount and retain the crop-cutting device on the feed rake of the harvesting machine, the pistons are pulled into the hydraulic cylinders, and the harvesting machine is moved into a pick-up position corresponding to the location of the load-bearing rods. After the load-bearing rods have been caught on the pick-up hooks of the hydraulic cylinders by lifting the feeder housing, and when the rear wall of the cutterbar trough rests on the front face of the feeder housing, a locking bar is pivoted by the machine operator so as to lock the position of the cutterbar trough relative to the feeder housing. This arrangement has the disadvantage that the crop-cutting device can only be adapted to unevenness of the ground in conjunction with the feeder housing. It is not possible to make a special alteration in the angular position of the cutter blade relative to the ground using this device.

SUMMARY OF THE INVENTION

It is an object of the present invention to overcome one or more of the deficiencies described above.

An object of the invention is to provide an arrangement that allows easy pick-up and removal of the crop-cutting device and allows adjustment of the angular position of the crop-cutting device relative to the feeder housing.

In accordance with one aspect of the invention, there is provided an apparatus for mounting and retaining a crop-cutting device on a pivotal feed rake of a harvesting machine which includes at least two pairs of spaced web plates attached to the crop-cutting device, a plurality of load-bearing rods mounted between each pair of spaced web plates, a horizontal axle that connects the crop-cutting device and the pivotal feed rake, and at least two hydraulic cylinder units with the piston end of each unit having a pick-up hook designed to engage one of the plurality of load-bearing rods. This arrangement allows the angular position of the crop-cutting device to be adjusted in a simple manner relative to the feeder housing by pre-selecting those load-bearing rods which are to be engaged by the pick-up hooks when mounting the crop-cutting device on the feeder housing.

Other objects, aspects, features and advantages of the present invention will become apparent from the following detailed description when taken in conjunction with the accompanying drawings.

BRIEF DESCRIPTION OF THE DRAWINGS

Reference is now made to the drawings which illustrate the best presently known mode of carrying out the invention and wherein similar reference characters indicate the same parts throughout the views.

FIG. 2 is a large scale longitudinal-sectional view of a cutting device mounting apparatus incorporating an embodiment of the present invention taken generally along the line II—II of FIG. 3.

DETAILED DESCRIPTION

Figure 1:
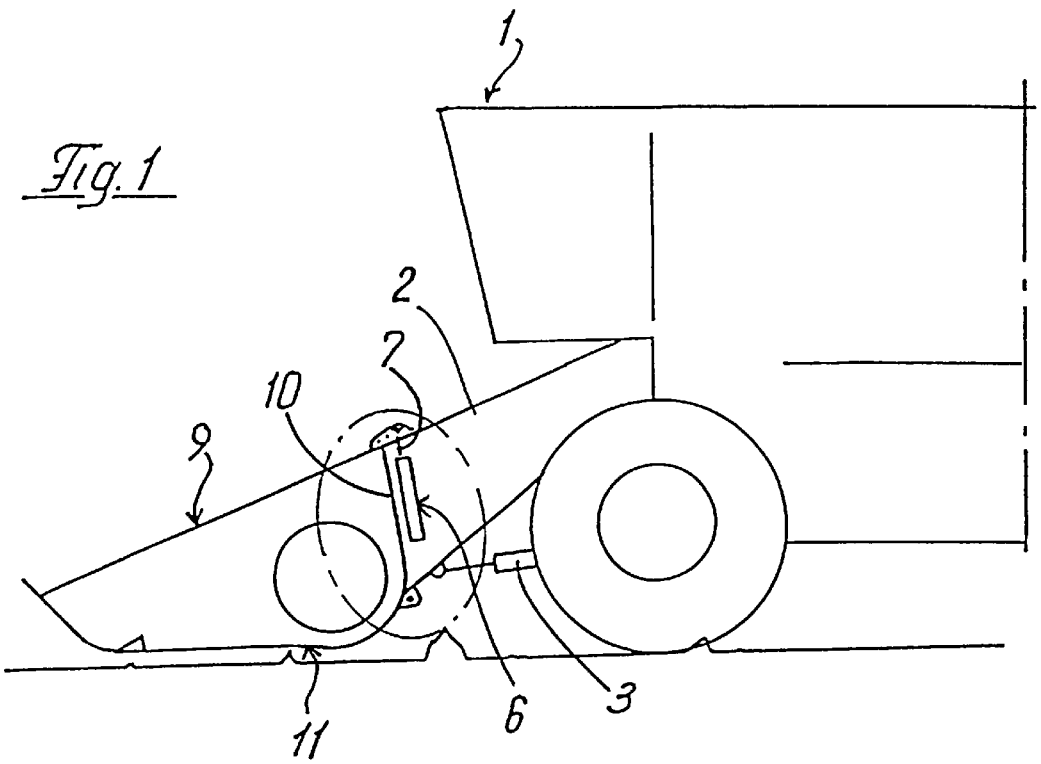
FIG. 1 is a schematic side view of the front portion of a self-propelled combine harvester.

FIG. 1 illustrates the front end of a combine harvester 1, showing a feed rake 2 and a crop-cutting device 9. The crop-cutting device 9 includes a cutterbar trough 11 having a rear wall 10. The feed rake 2 is pivotally connected to the combine harvester 1. The angle of the feed rake 2 relative to the combine harvester 1 is manipulated by a hydraulic cylinder unit 3. The crop-cutting device 9 is pivotally mounted to the feed rake 2. The angle of the crop-cutting device 9 relative to the feed rake 2 is adjusted by a plurality of hydraulic cylinder units 6 which are advantageously double acting. As shown in FIG. 2, the cylinders 5 of the hydraulic cylinder units 6 are rigidly connected to the frontal regions of the feed rake side walls 4 in any convenient manner, for example as by a weld W. Each of the hydraulic cylinder units 6 has a connecting rod 7 which incorporates a pick-up hook 8 at its freely extending end.

Figure 3:
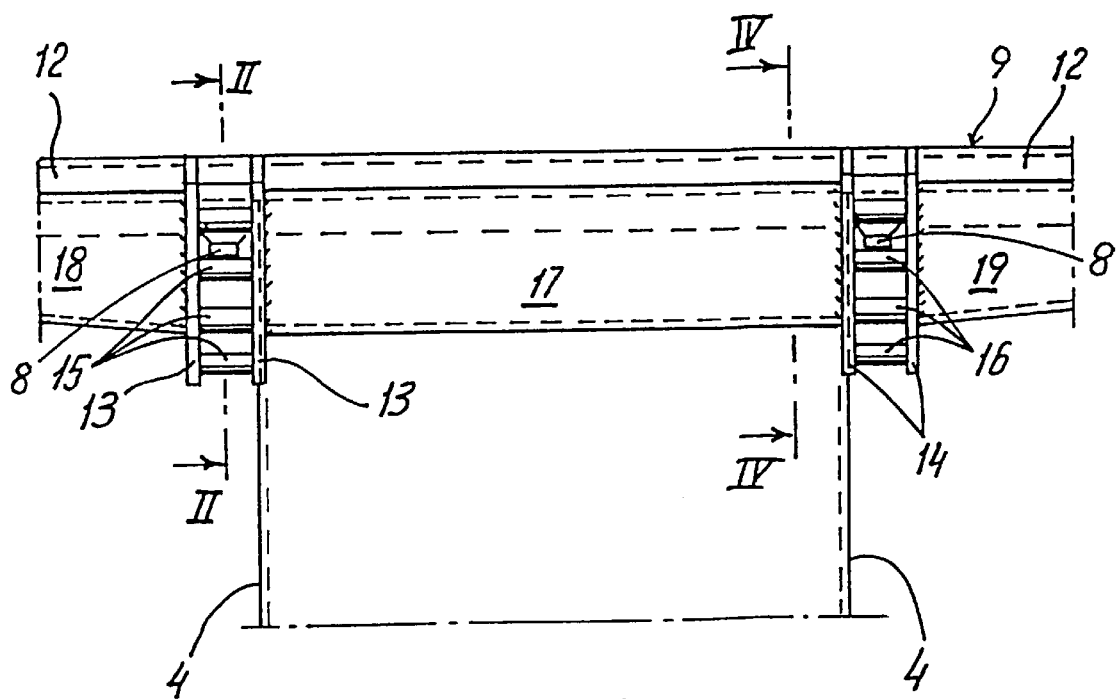
FIG. 3 is a top view of the mounting apparatus shown in FIG. 2.
Figure 4:
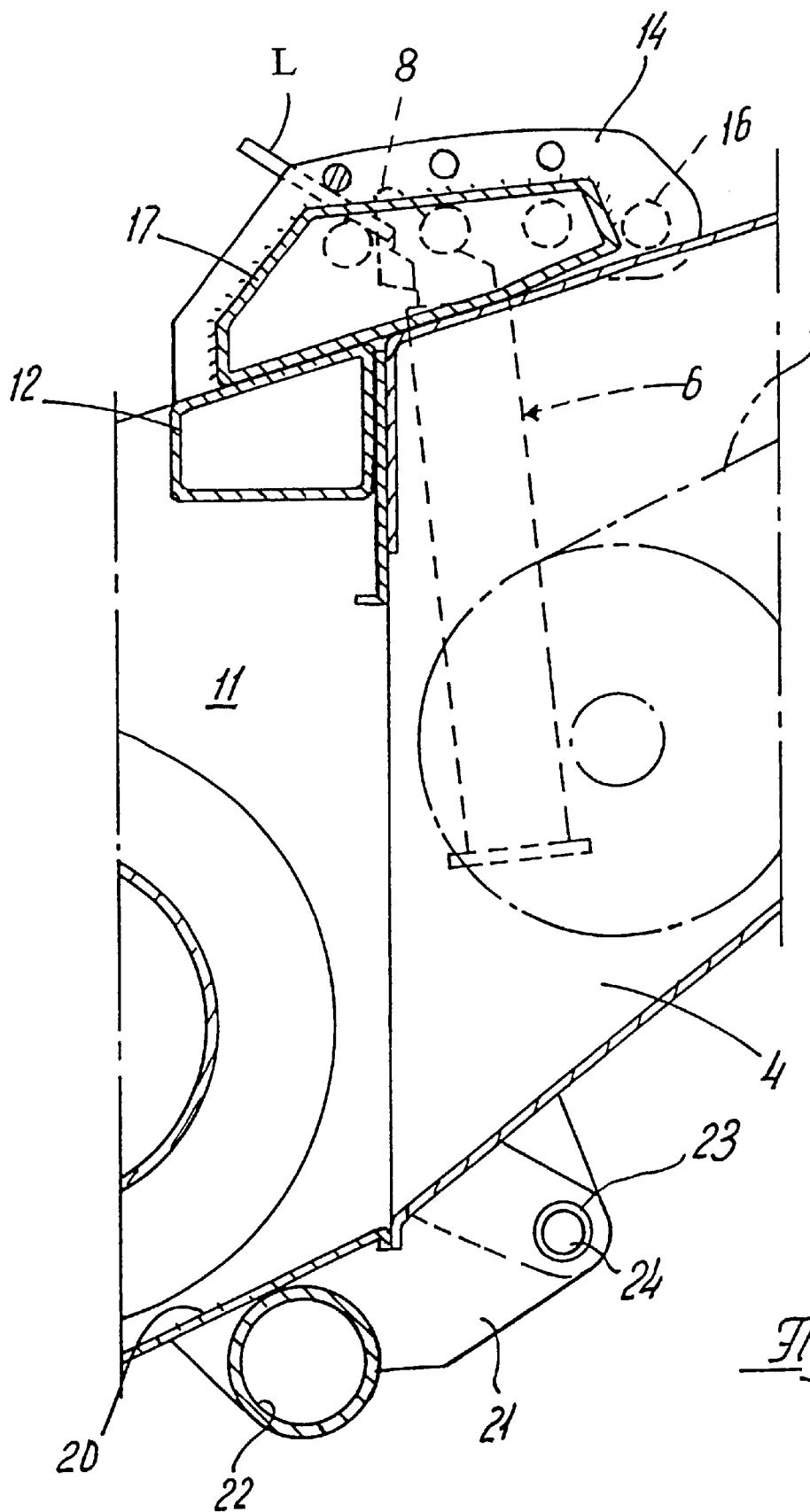
FIG. 4 is a large scale longitudinal-sectional view taken generally along line IV—IV of FIG. 3.

As shown in FIGS. 2 and 4, a structural member 12 is rigidly connected to the upper part of the rear wall 10 of the cutterbar trough 11 and extends across the entire width of the cutterbar trough 11. Two pairs of spaced web plates 13, 14 are welded to the upper face of the structural member 12. A plurality of load-bearing rods 15, 16, conveniently four in number, extend between each pair of web plates 13 and 14, respectively. The rods 15, 16 may be in the form of bolts, if desired. While the rods are shown as having a circular cross-section, other shapes may be utilized. As best shown in FIG. 3, the pairs of web plates 13, 14 are welded at each side to box section frames 17, 18, 19 to provide lateral reinforcement. As can be seen from FIGS. 2–4, the box section frames 17, 18, 19 and the web plates 13, 14 project rearwardly beyond the rear wall 10 of the cutterbar trough 11. This arrangement allows the pick-up hooks 8 to easily engage a selected pair of load-bearing rods 15, 16 from below.

Once the pick-up hooks 8 have engaged the selected load-bearing rods 15, 16, and the crop-cutting device 9 is lifted, the crop-cutting device 9 is supported on the selected load-bearing rods 15, 16. The crop-cutting device may be secured in position by fasteners, latches or other convenient devices. For example, latching members L may be moved laterally into position to engage a detent surface 8A on each of the pick-up hooks 8, as shown in FIG. 2. The latching members L may be held in position by any standard fastening device, such as bolts or screws. Once the latching members L are in position, the pick-up hooks 8 are locked into their engagement with the load-bearing rods 15, 16. The latching members L are removed before the pick-up hooks 8 are disengaged from the selected load-bearing rods 15, 16.

The base 20 of the cutterbar trough 11 is equipped with two end brackets 21 in the vicinity of the rear wall 10. These brackets are interconnected by a tubular bar 22 for stabilizing purposes. The freely extending ends of the bracket 21 have borings 23 for accommodating an axle 24. The axle 24 is supported by two extensions of the side wall 4 of the feed rake 2. The entire crop-cutting device 9, including the finger bar (not shown), pivots about this axle 24.

The angle of the crop-cutting device 9 is adjusted depending on the type of crop being harvested. This angle is manipulated by which particular pair of load-bearing rods 15, 16 have been engaged by the pick-up hooks 8. The maximum forward rotation position of the crop-cutting device 9 relative to the feed rake 2 is represented by the dash-dotted lines in FIG. 2.

For removal of the crop-cutting device 9 from the harvester, the axle 24 is first withdrawn axially. The feed rake 2 is then pivoted downward by means of the hydraulic cylinder unit 3 until the crop-cutting device 9 rests on the ground. The latching members L are then removed. The connecting rods 7 of the hydraulic cylinder units 6 are then driven inwards, thereby releasing the pick-up hooks 8 from the load-bearing rods 15, 16. The recoupling of the crop-cutting device 9 is accomplished by performing the above steps in the reverse order.

While a preferred embodiment of the preferred invention has been illustrated and described, this has been by way of illustration and the invention should not be limited except as required by scope of the appended claims.

What is claimed is:

1. An apparatus for mounting and retaining a crop-cutting device on a pivotal feed rake of a harvesting machine, comprising:
    at least two pairs of spaced web plates attached to the crop-cutting device;
    a plurality of load-bearing rods mounted between each pair of spaced web plates;
    a horizontal axle that connects the crop-cutting device and the pivotal feed rake; and,
    at least two hydraulic cylinder units with first and second ends, each hydraulic cylinder unit being mounted on the pivotal feed rake at the first end and having a pick-up hook attached to the second end, each pick-up hook being constructed and arranged to engage one of the plurality of load-bearing rods between each pair of spaced web plates.

2. An apparatus for mounting and retaining a crop-cutting device on a pivotal feed rake of a harvesting machine as set forth in claim 1, wherein the crop-cutting device has a rear wall with an upper edge and a lower region and wherein the pairs of spaced web plates are attached to the upper edge of the rear wall and the horizontal axle connects the lower region of the rear wall and the pivotal feed rake.

3. An apparatus for mounting and retaining a crop-cutting device on a pivotal feed rake of a harvesting machine as set forth in claim 1, wherein the pick-up hooks engage the load-bearing rods from below.

4. An apparatus for mounting and retaining a crop-cutting device on a pivotal feed rake of a harvesting machine as set forth in claim 1, wherein the first ends of the hydraulic cylinder units are attached to side walls of the pivotal feed rake.

5. An apparatus for mounting and retaining a crop-cutting device on a pivotal feed rake of a harvesting machine as set forth in claim 2, wherein a portion of the web plates projects rearwardly beyond the rear wall of the crop-cutting device and at least one of the load-bearing rods is located between the web plates in the portion projecting rearwardly beyond the rear wall.

6. An apparatus for mounting and retaining a crop-cutting device on a pivotal feed rake of a harvesting machine as set forth in claim 2, wherein the web plates are rigidly connected to box section frames.

7. An apparatus for mounting and retaining a crop-cutting device on a pivotal feed rake of a harvesting machine as set forth in claim 6, wherein the box section frames are rigidly connected to the upper edge of the rear wall of the crop-cutting device and project rearwardly thereof.

8. An apparatus for mounting and retaining a crop-cutting device on a pivotal feed rake of a harvesting machine as set forth in claim 2, further including a structural member rigidly connected to the upper edge of the rear wall.

9. An apparatus for mounting and retaining a crop-cutting device on a pivotal feed rake of a harvesting machine as set forth in claim 1, wherein each pick-up hook includes a detent surface and each latching member is constructed and arranged to engage a respective detent surface to hold the pick-up hooks in engagement with the load-bearing rods.

* * * * *